(12) United States Patent
Allen et al.

(10) Patent No.: US 7,158,263 B2
(45) Date of Patent: Jan. 2, 2007

(54) DYNAMIC GENERATION OF LINEARIZED HALFTONE MATRIX

(75) Inventors: William J Allen, Corvallis, OR (US); Johan Lammens, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 827 days.

(21) Appl. No.: 09/915,417

(22) Filed: Jul. 27, 2001

(65) Prior Publication Data
US 2002/0024687 A1 Feb. 28, 2002

(30) Foreign Application Priority Data
Jul. 27, 2000 (EP) .................................. 00116343

(51) Int. Cl.
*G06K 15/00* (2006.01)
*H04N 1/405* (2006.01)
*H04N 1/46* (2006.01)

(52) U.S. Cl. .................... 358/3.13; 358/3.16; 358/535; 358/536

(58) Field of Classification Search ............... 358/3.13, 358/3.14, 3.15, 3.16, 3.17, 3.18, 3.19, 535, 358/536
See application file for complete search history.

(56) References Cited

U.S. PATENT DOCUMENTS 6,067,406 A  5/2000 Van Hoof et al. .......... 395/109
6,643,032 B1 * 11/2003 Crean et al. ................ 358/3.06
6,831,756 B1 * 12/2004 Ushiroda .................... 358/1.9

FOREIGN PATENT DOCUMENTS

| EP | 0673151 A2 | 9/1995 |
| EP | 0828378 A2 | 3/1998 |
| EP | 0859506 A1 | 8/1998 |
| WO | WO99/57886 | 11/1999 |

OTHER PUBLICATIONS

European Search Report of Application No. EP 00116343, dated Oct. 1, 2001 (3 pages).

* cited by examiner

*Primary Examiner*—Thomas D. Lee

(57) ABSTRACT

There is disclosed a method of dynamic generation of a linearized halftone matrix from a high bit resolution halftone matrix, for use in a printer device, for example a domestic or office printer device or a commercial high resolution printer device. A high bit resolution halftone threshold matrix is converted into a vector format (700). A tone correction function is applied by selecting a variable number of index values, each index value representing a threshold level. A tone corrected two-dimensional 8 bit threshold level matrix, is then applied to a corresponding print image plane comprising a plurality of pixels to obtain a two dimensional print data for each of a plurality of colors of an image. The print data is printed as a plurality of dots by a print head to form a printed image using a halftoning method.

26 Claims, 14 Drawing Sheets

| Index | X | Y |
|---|---|---|
| 0 | 1 | 2 |
| 1 | 2 | 1 | ← 1001
| 2 | 1 | 1 |
| 3 | 2 | 2 |
| 4 | 0 | 3 |
| 5 | 3 | 0 |
| 6 | 0 | 0 |
| 7 | 3 | 3 |
| 8 | 1 | 3 |
| 9 | 2 | 0 |
| 10 | 0 | 1 |
| 11 | 3 | 2 |
| 12 | 1 | 0 |
| 13 | 0 | 2 |
| 14 | 2 | 3 |
| 15 | 3 | 1 | ← 1100

Fig. 11

| Input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Output | 0 | 1 | 2 | 3 | 3 | 4 | 5 | 6 | 6 | 7 | 8 | 9 | 10 | 11 | 13 | 16 |

DYNAMIC GENERATION OF LINEARIZED HALFTONE MATRIX

FIELD OF THE INVENTION

The present invention relates to the field of printing, and particularly although not exclusively to a method for generating a tone corrected halftone matrix.

BACKGROUND TO THE INVENTION

Conventional printers, for example commercial computer printers for use in the office or home for printing out images in general including photographs, drawings, text, web pages and the like, and commercial printers for high quality drawings printing, use a process of digital halftoning to convert electronic image data into print instructions sent to a printer head in order to print a plurality of small dots onto a print medium e.g. paper, to create an image on the print medium. Typically for text or line drawings, half-toning is not needed, because lines are printed solid, however halftoning is used for printing images having varying shades of color or gray, such as photographs. Conventional digital half-toning methods are well known in the prior art.

Referring to FIG. 1 herein, there is illustrated schematically signal processing involved in a conventional halftoning process. Image data is stored as electronic signals in an electronic buffer. The image data is arranged in a plurality of image planes, each image plane corresponding to a color which is to be printed. In the example of FIG. 1, there are four image planes 100–103, corresponding to cyan, magenta, yellow and black respectively. Each image plane comprises a two dimensional array of pixels, where each pixel has an intensity according to a gray scale having, for instance, 256 levels stored as one byte of gray scale information per pixel.

Referring to FIG. 2 herein, there is illustrated a signal processing stage for applying a halftone matrix data to one of the image planes shown in FIG. 1. The matrix data has 4 matrix planes, corresponding with the 4 color planes of the image data. The halftone matrix plane comprises a two dimensional array of a plurality of data elements each data element comprising a halftone threshold value. Each pixel of the image plane 100 is aligned with a corresponding respective halftone value in a two dimensional halftone matrix plane 200 so there is one halftone threshold value for each pixel. An N×N element halftone matrix is tiled across the image, which is typically larger than N×N elements, so that every threshold value is aligned with one pixel value. Tiling the halftone matrix allows use of a halftone matrix which is smaller than an image size. Typically, a halftone matrix has a plurality of threshold values of different value arranged in a semi-random order in two-dimensions. Each image plane has its own corresponding respective halftone matrix plane, and one such relationship between an image plane 100 and a halftone matrix plane 200 is shown in FIG. 2. Each element in the halftone matrix plane 200, has a halftone threshold value, which is graded according to an 8 bit value, that is 256 levels of halftone threshold. A complete image in 4 colors would have 32 bit resolution, that is to say 8 bits per pixel per plane.

The halftone threshold matrix determines whether a dot will be printed or not printed, for the corresponding respective pixel of the image plane. The data from the image plane is combined with the data in the corresponding halftone threshold matrix plane, to result in a planar print data 201 which comprises a matrix of signals to either print or not print a dot at a corresponding X, Y coordinate of the plane. For example, where an image data in the image plane has a 50% gray level, that is to say the pixels of the image each have a value of 127, where there are 256 possible gray levels, the resulting print data in the print plane 201 will have dots printed for approximately 50% of the pixels in the image plane, and the other 50% of the pixels in the image plane will not have corresponding printed dots in the print plane 201. The halftone matrix as such is not set to one value or another. Each individual threshold value, together with the image value, determines which pixels are printed.

Referring to FIG. 3 herein, there are illustrated prior art image processing steps carried out by a processor in a printer system for dynamically generating a print plane 201 for printing an image. Each pixel intensity value of the image plane 100 is compared with the corresponding respective halftone threshold value of the halftone matrix plane 200. In step 300 the image plane and halftone threshold plane are aligned with each other. The pixels of the image plane are compared with the corresponding respective elements of the halftone threshold matrix plane by scanning across the image plane left to right and top to bottom, in step 301, to obtain a 1:1 correspondence between each pixel and a respective element of the halftone threshold matrix in step 302. The value of each pixel is compared with a corresponding element value in the halftone threshold plane 200 in step 303. If the pixel value is more than the corresponding respective halftone matrix threshold value in step 304, then a print data is stored in the print plane 201 indicating that the pixel is to be printed, and a corresponding dot is printed. However, if the pixel value is less than the corresponding respective halftone threshold value, then in step 305 data is stored in the print plane 201, indicating that the pixel is not to be printed, and a dot is not sent to print.

Each threshold value in the matrix has 8 bits, so that each 8 bit pixel in each color image plane is compared with a corresponding respective 8 bit threshold value in the corresponding halftone threshold matrix plane for that color. Conventionally, prior art 8 bit per pixel halftone threshold matrices are created off line to suit the performance and other characteristics of a print system, and are stored in read only memory (ROM), or on disk, and are invariant over time. That is, once generated, the stored halftone threshold matrices are not changed in the printer device. Once the halftone matrix is generated, it is repeatedly used and is not changed.

It is desirable from performance and image quality stand points to have a halftone matrix that is linear. Linear means that a system response is linear with respect to digital counts input to a halftoning module. Since system response varies with environment, print cartridge setting, medium and the like, it is desirable to have the ability to dynamically vary the linearization depending upon the state of the printer system.

Referring to FIG. 4 herein, there is illustrated schematically prior art signal processing for producing a tone corrected image. A target response 400 corresponding to an ideal print head response is either stored within the printer device or defined analytically. An actual response curve 401 is measured by performing a calibration test. A calibration function (otherwise called a linearization function) is applied, with knowledge of the target response 400 and actual response 401. The calibration function (linearization function) is applied to an image data 403 in step 404, resulting in a modified image data 405. The modified image data is half-toned in step 406, which is then sent as a signal to a printer head to print in step 407.

Conventionally, the linearization is applied to the image data before half-toning as shown in FIG. 4. For example, whenever an image data input, for example, 80% intensity is received, in order to obtain the ideal response, the 80% image data input is substituted by, say for example, 60% of the image data, according to the calibration function. In the prior art, the modified image data is then half-toned prior to printing.

A known technique involves using a look up vector to change the input data before halftoning. The vector is changed depending on the linearization required. However, this technique often introduces unwanted contouring in an output plot. If the correction is strong, unique states of the input data are lost.

Another known approach is to generate a halftone matrix which is inherently linearized with respect to a given set of conditions by modifying the number of dots printed for each input image gray level. Since conditions vary, the matrix should, in principle, be regenerated from time to time after the product leaves the factory. However some forms of halftone matrices are expensive in terms of time and/or memory to generate, which renders them ill-suited to dynamic generation in a printer product.

Using predefined matrices for every possible linearization is not reasonable, as it would be prohibitive to store the required number of matrices in a printer product.

SUMMARY OF THE INVENTION

The invention concerns a process applicable to any type of known threshold matrix based halftoning system, for rapidly generating a matrix with a given tone response in terms of number of dots as a function of input in digital counts.

In specific implementations a 16 bit threshold matrix is obtained and stored in a printer device in a modified format. The modified format is termed herein as a level vector. When required, an 8 bit threshold matrix is rapidly generated with any given linearization from the data contained in the level vector, and a second vector specifying the desired linearization (termed herein a linearization vector).

According to the first aspect of the present invention there is provided a method of generating halftone threshold matrix data for an image printer, said method comprising the steps of:

taking a stored higher bit content halftone matrix data;

reducing said high bit content halftone matrix data to a relatively lower bit content halftone matrix data, within said image printer, wherein said step of reduction comprises incorporating a printer response correction function into said relatively low bit content halftone matrix data.

According to a second aspect of the present invention there is provided a method of generating a halftone matrix data having a predetermined response of number of dots printed as a function of digital input value, said method characterized by comprising the steps of:

storing data describing a plurality of data elements as a plurality of vector entries, each said vector entry comprising an index number corresponding to a higher bit content per element halftone threshold level, an X coordinate data corresponding to a position in a first dimension, and a Y coordinate data corresponding to a position of said entry in a second dimension, said X and Y coordinate data positioning said index number in a two dimensional plane;

storing a tone correction data as a list of numbers (401);

sequencing through said list of numbers (1001) and for each said number of said list, assigning a halftone threshold level to a corresponding number of said vector entries, wherein for each said number of said list, a different said halftone threshold value is assigned; and generating (504) a lower bit content per element two dimensional halftone threshold level matrix (402) from said plurality of vector entries and their corresponding respective assigned halftone threshold levels.

Preferably said step of generating a two dimensional halftone threshold level matrix comprises:

for each said vector data entry, storing a threshold level data assigned to said index value in a position within said two dimensional halftone threshold level matrix corresponding to said X and Y coordinates of said vector data entry.

According to a third aspect of the present invention there is provided a method of generating halftone threshold data for an image printing system, said method characterized by comprising the steps of:

storing a higher bit content threshold level data (600) comprising a plurality of individual threshold level elements;

converting (500) said higher bit content threshold level data into at least one level vector, said level vector (400) comprising a plurality of vector data entries each of an index value number representing a high bit content level value of a halftone threshold level value, and a corresponding coordinate of said threshold level value;

applying (502) a tone correction function by specifying a number of said vector data entries to be selected;

selecting said number of vector data entries from said plurality of vector data entries in said level vector, said selected plurality of vector data entries having highest index numbers, corresponding to highest threshold level numbers of said plurality of vector data entries; and transforming (504) said plurality of selected vector data entries into a lower bit content two dimensional threshold matrix.

According to a fourth aspect of the present invention there is provided a method of applying a correction to image data to correct for a printer response characteristic, said method comprising the steps of:

generating a correction characteristic to correct for a response of said printer device;

applying said correction characteristic to a relatively high bit content half tone matrix data, to obtain a relatively low bit content half tone matrix data corrected for said printer response; and processing said image data using said relatively low bit content half tone matrix data.

A said high bit content threshold level matrix 600 may comprise a matrix having 16 bits per element. The relatively high bit content 16 bit per element threshold level matrix is converted to a relatively low bit content threshold matrix having a plurality of elements each having for example 8 bits per element. Conversion is done dynamically according to a number input from a linearization vector stored in a printer device.

The method is easily applied to a multiple plane, e.g. four plane image using four independent matrices.

Specific implementations according to the invention may have the following advantages:

A level vector is easily computed by translating from a two dimensional 16 bit threshold matrix. The level vector occupies the same amount of memory as the two dimensional 16 bit threshold matrix.

The methods are applicable to any style of half-toning that can be represented in a conventional two dimensional threshold matrix, including threshold matrices purchased from third parties.

Image quality may be improved by eliminating contouring caused by low resolution linearization applied before half-toning.

Execution time and half-toning time are reduced when compared to a prior art low resolution linearization applied before half-toning.

Generation of an 8 bit threshold matrix is relatively fast, and occurs in a deterministic amount of time that is largely independent of the data stored in the linearization matrix and level vector.

The methods are compatible with prior art dynamic compensation systems such as Hewlett Packard Design Jet 2500 CP.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 11 illustrates schematically a two dimensional representation of a level vector format of threshold level data of FIG. 10, according to a specific method of the present invention;

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Specific implementations according to the invention are concerned with generating relatively low resolution, M bit per pixel, e.g. 8 bit per pixel, tone corrected matrices online in a printer system, which are tone corrected to compensate for variations of printer system response, using as a starting point a relatively higher N bit per pixel halftone threshold matrix. In concept, a bit depth of a high bit content halftone matrix is reduced, and a correction function e.g. a linearization function is incorporated, to result in a lower bit content halftone matrix which can be generated dynamically.

In the specific implementations described herein, there is provided high resolution offline N bits per pixel calculated halftone threshold data for each of a plurality of image color planes. Offline calculated means that the high bit content halftone threshold data is calculated outside of the printer system where it is applied. In the high bit content halftone threshold data, there is provided an N bit threshold value, where N is any number of bits which gives a relatively high bit content, for example a 10, 12 or 16 bit threshold value corresponding to each pixel in the image color planes. This enables a large range of different threshold values in the threshold matrix. On incorporating a printer correction function into the higher bit content threshold matrix, a lower bit content threshold matrix results, but because a high bit content half tone matrix is the starting point, granularity of halftone levels is maintained in the resultant corrected low bit content matrix. Whereas an 8 bit threshold value would allow 256 different levels of threshold value, a 10 bit threshold value allows 1024 different levels, a 12 bit threshold value allows 4096 different levels of threshold value per image pixel for each color, or a 16 bit threshold value allows 64 k (65,536) of different levels for each pixel. The lower bit content tone corrected matrices have a number M bits per pixel, where M is less than N.

Figure 5:
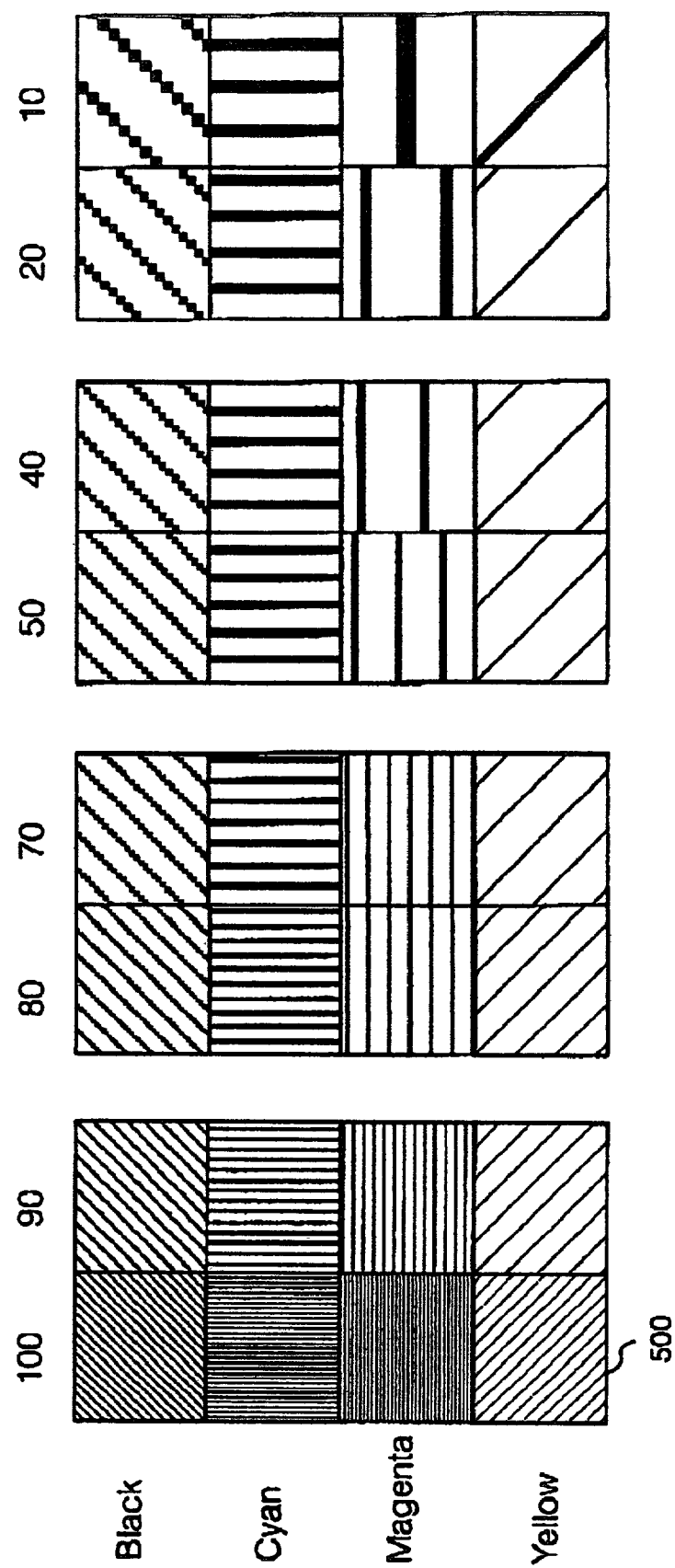
FIG. 5 illustrates schematically a calibration target printed by a printer device for calibrating operation of the printer device.

Referring to FIG. 5 herein, there is illustrated schematically a print test carried out by a printer for calibration purposes. The printer is activated in a calibration mode to print different areas of color in a plurality of patches, each having a different intensity. The printer prints a plurality of ramps of graded patches of color as a calibration test on its own initiative, for example on start up. Zero intensity patches are not printed, since these are merely the background sheet material media, e.g. white paper. The colors printed are for example black, cyan, magenta and yellow. For each color, patches are printed in increasing intensity, for example at 10%, 20%, 40%, 50%, 60%, 80%, 90% and 100% of the color intensity. The graded ramp of colors is then read by an optical sensor traversing a print media onto which the ramp of graded color patches is printed, which gives a response curve for each color resulting from the calibration print.

The densities of the patches are measured by the optical sensor. The density may be measured in absolute terms, e.g. relative to a pure white such as a halon, or in relative terms, that is relative to the white media sheet background (white paper) and the 100% black patch, or a black trap, or a dark area provided within the printer device.

Figure 6:
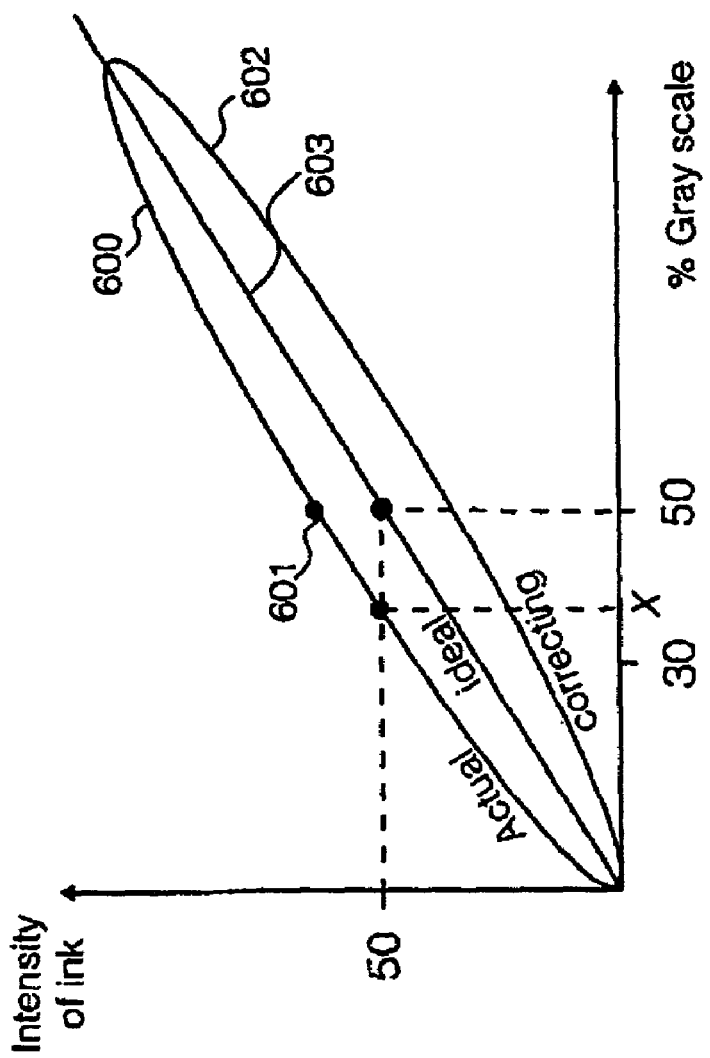
FIG. 6 illustrates schematically a characterization curve for a printer, together with a matching correction curve for compensating for the characterization curve.

Referring to FIG. 6 herein, there is illustrated schematically a characterization curve 600 determined from the patch calibration of FIG. 5, characterizing a response of a particular printer to various levels of gray level signal input. The characterization curve 600 plots percentage of gray scale to be printed, that is percentage gray scale instructed to a print head of the printer, against measured intensity or density of ink as printed. For example, the print head may be instructed to print at intervals of 10%, 20%, 30%, 40% and 50% gray scale. An ideal printer, prints 50% ink density in response to a 50% gray scale signal input. However, printer heads may have non-linear responses as illustrated by the actual print head characteristic curve 600. In this case, for a given percentage gray scale, the print head behaves to give a higher density of printed ink than required. For example, for a 50% gray scale signal, the print head may actually print a higher than 50% density ink as shown by point 601 in FIG. 6. Similarly, for other percentage gray scales the print head may print ink more densely. To linearize the overall response of the printer to image data, the printer needs to apply a linearization characteristic illustrated by line 602 which rectifies the density of ink actually printed to be the same as that instructed by the gray scale signal and to obtain an overall response corresponding to ideal response curve 603. Thus, in order to print 50% ink density, a 50% gray scale signal would be modified to give a signal equivalent to a lower than 50% gray scale signal so that when the non-linear response of the print head is taken into account, the actual density of ink printed is 50%. In FIG. 6 x is the correcting value of gray scale % to give 50% intensity response. Similarly for all other percentages of gray scale. The linearization function 602 applies for a particular set of print heads and a particular set of media for a particular printer device. The linearization function cannot be pre-calculated, but depends upon the conditions of the printer at the time, including temperature, humidity, type of media loader, i.e. ink plus sheet material, and the condition of the print heads. The ideal response, in this case straight line 603, does not necessarily have to be linear, although in many cases it is. The calibration pattern is printed for each of the different inks which are loaded into the printer device. The ideal response 603 can be stored inside the printer, or can be stored as an analytic linear function between a minimum and maximum intensity.

Correction function 602 constitutes a linearization vector. To correct for the non linear printer response, for each point on the actual printer characteristic 600, there needs to be found a corresponding point on the linearization function 602 which, when applied to an image data corrects the print result to an ideal response for an instructed percentage gray scale.

Figure 7:
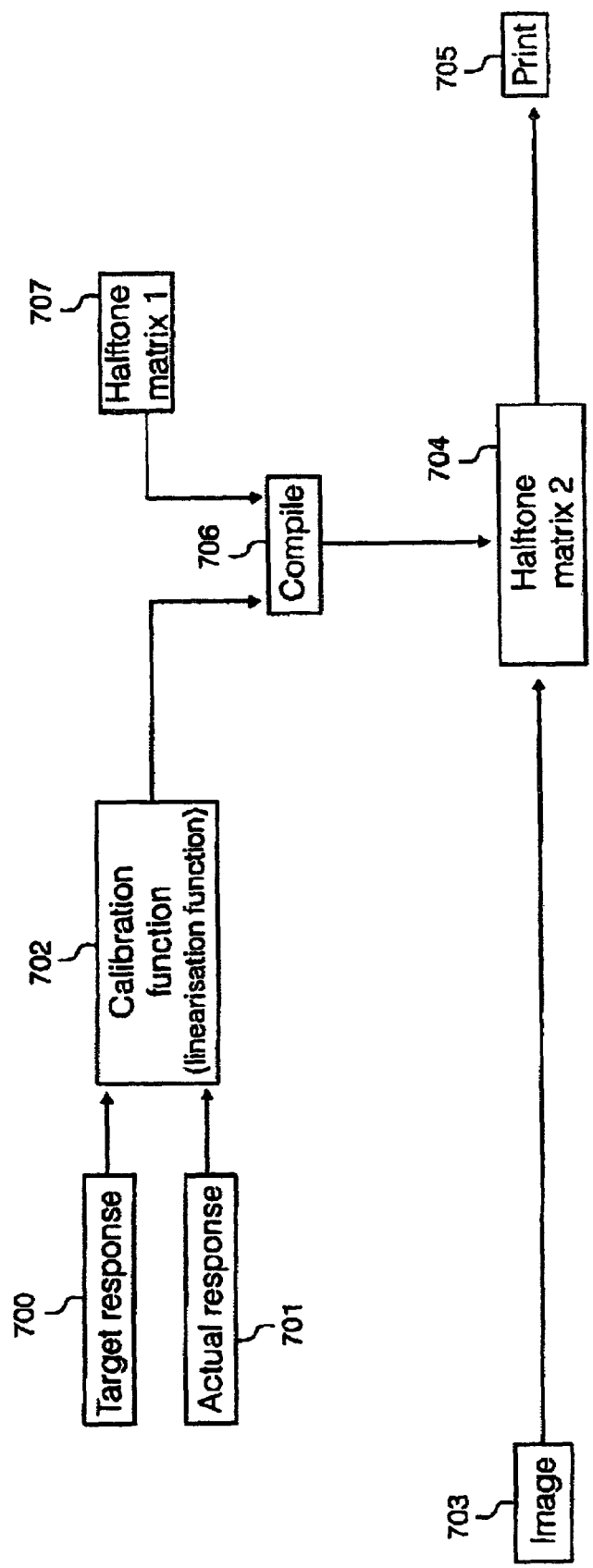
FIG. 7 illustrates schematically a signal processing method for applying a dynamically generated corrected halftone matrix to a stream of image data.

Referring to FIG. 7 herein, there is illustrated schematically signal processing occurring in a printer device according to the specific implementation of the present invention, for applying a dynamically generated linearized half-tone matrix to an image data. A target response 700, is pre-stored or generated on the fly. An actual response characteristic 701, obtained by printing calibration patches as described with reference to FIG. 5 herein, is obtained. In process 702, a calibration function (linearization function) is obtained as illustrated schematically with reference to FIG. 6. The linearization function is built into an 8 bit half-toning matrix and combined with an image data 703 in process 704. The half-toned and linearized image data is sent to print in print process 705. Prior to being applied to the image data, the linearization function is compiled in step 706 with a 16 bit halftone matrix 707. The 16 bit half-tone matrix 707 is converted into an 8 bit halftone matrix 704 by compiling the linearization function 702 with the 16 bit half-tone matrix 707 in step 706. The linearization function is applied to the image data during half-toning in process 704, rather than as a separate step prior to half-toning. Since the linearization function gets built into the half-toning matrix in process 706, the prior art computational steps of applying a linearization function to an image data prior to half-toning can be avoided.

Compilation in step 706 is done only once, and image data 703 is continuously processed via the linearized half-tone matrix 704 to produce print images 705. The 16 bit half-tone matrix does not change, whereas the linearization function may change every time the printer is re-started. The 8 bit linearized half-tone matrix 704 is the matrix actually used for processing image data 703. The 16 bit half-tone matrix 707 is provided as 16 bit data, because if an 8 bit half-tone matrix was used instead, then in the process of applying the linearization function, gray levels would be lost. By using a 16 bit half-tone matrix 707, a linearized 8 bit half-tone matrix can be achieved, without loss of gray level.

Figure 8:
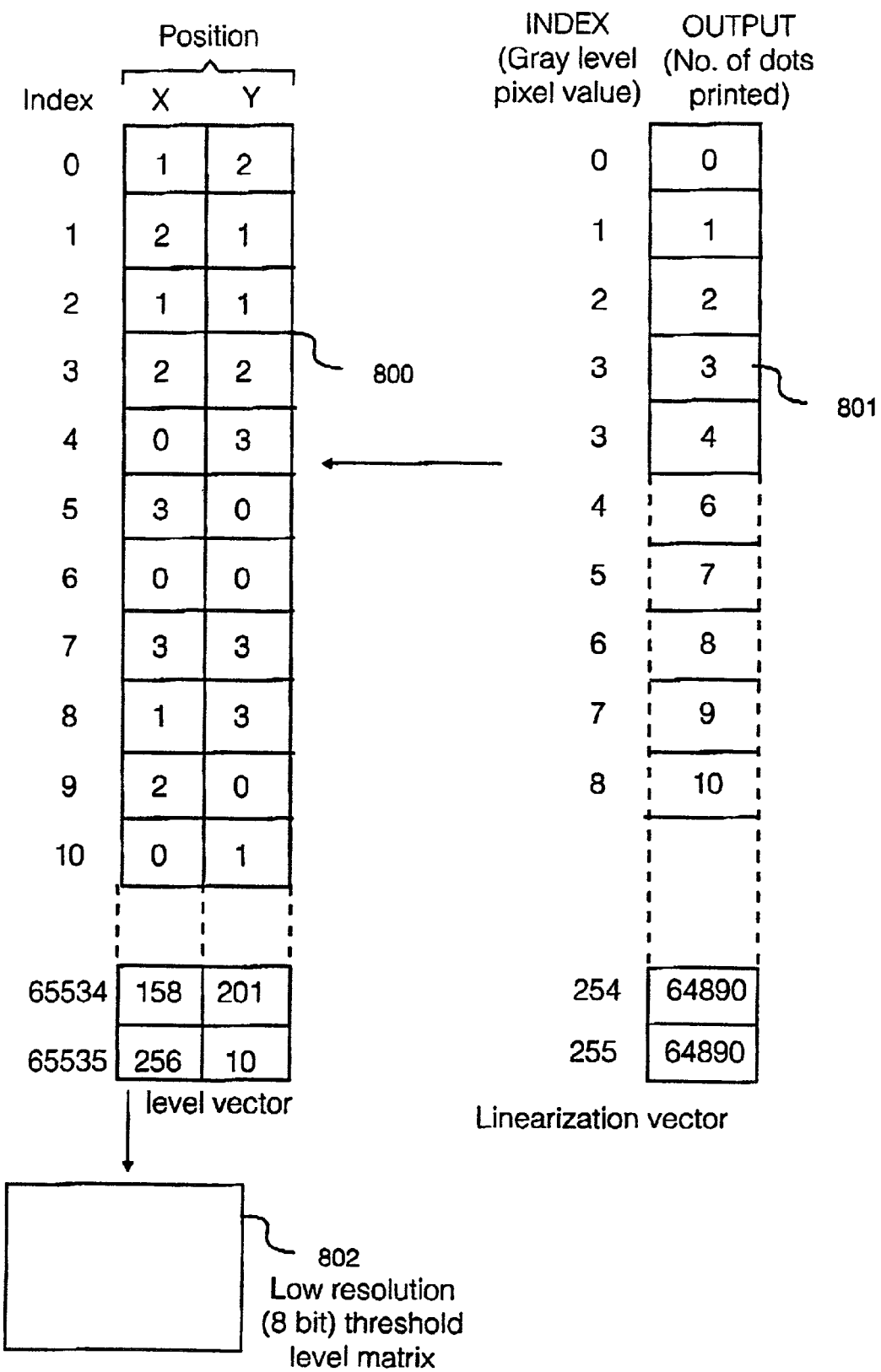
FIG. 8 illustrates schematically signal processing steps for applying a tone correction function to a high bit content threshold level matrix, to obtain a lower bit content halftone threshold level matrix according to a specific method of the present invention.

Referring to FIG. 8 herein, there is illustrated a signal processing method according to a specific implementation of the present invention, for applying a tone correction function contained in a high N bit per element content (e.g. 10, 12 or 16 bit per element) threshold level data to result in a low M bit per element content, e.g. in an 8 bit per element, threshold level matrix in a printer device. In this example, a 16 bit threshold level is provided at each element of the threshold level data 800.

The low bit content threshold matrix 802 having a plurality of 256×256 data elements each storing a threshold level of M bits, each threshold level corresponding to a respective pixel in an image plane, is dynamically generated from the high bit content data 800, according to a digital number input stored as a linearization vector data 801, which specifies a number of dots to be printed.

In the specific implementation, for each color plane of an image, a 16 bit per element data of threshold values 800 is stored in an electronic buffer in vector format. This data is termed a level vector 800 herein and is in the form of a list of X, Y coordinates, each X, Y coordinate having a corresponding respective index number, of which there are for example 65,536, one for each element of a 256×256 element array. The level vector has an indexed data entry for each of the positions of a two-dimensional array. The level vector stores in vector format, different threshold levels which are derived from an offline generated high bit content e.g. 256×256 element threshold level matrix.

A tone correction function represented in FIG. 8 as a linearization vector 801, is applied to the level vector data.

Figure 1:
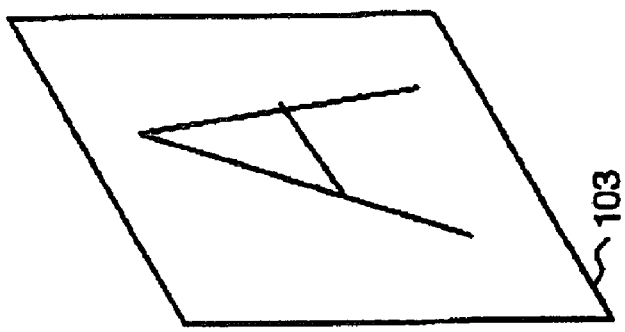
FIG. 1 herein illustrates schematically a prior art electronic storage of an image data in a plurality of image planes, each corresponding to a different color of the image.
Figure 1:
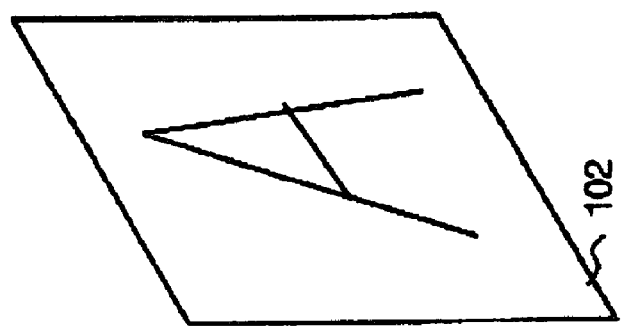
Figure 1:
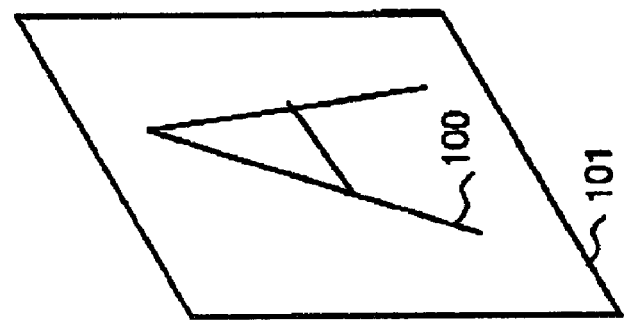
Figure 1:
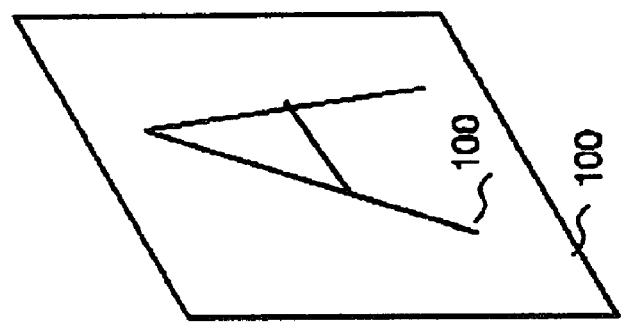
Figure 2:
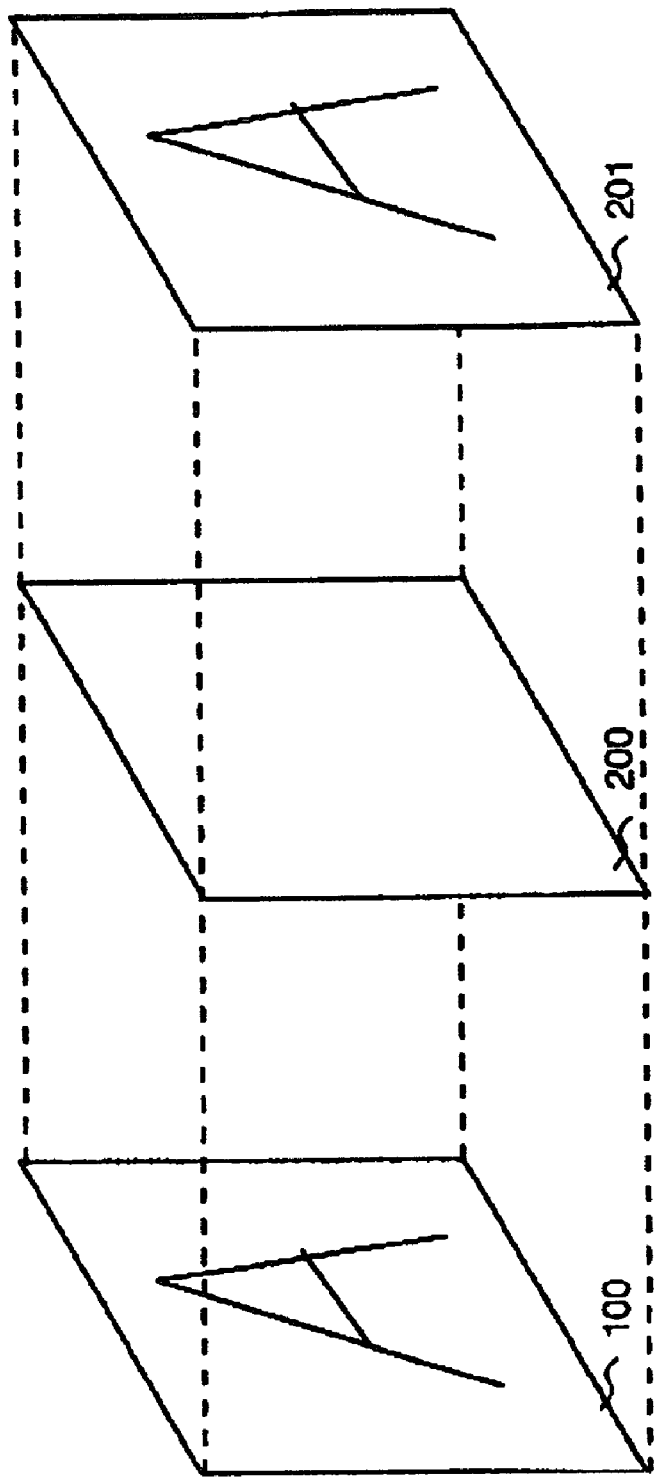
FIG. 2 illustrates schematically a prior art signal processing stage carried out on an image plane for applying a halftone threshold matrix to a color plane of the image, to produce a halftoned image matrix.
Figure 3:
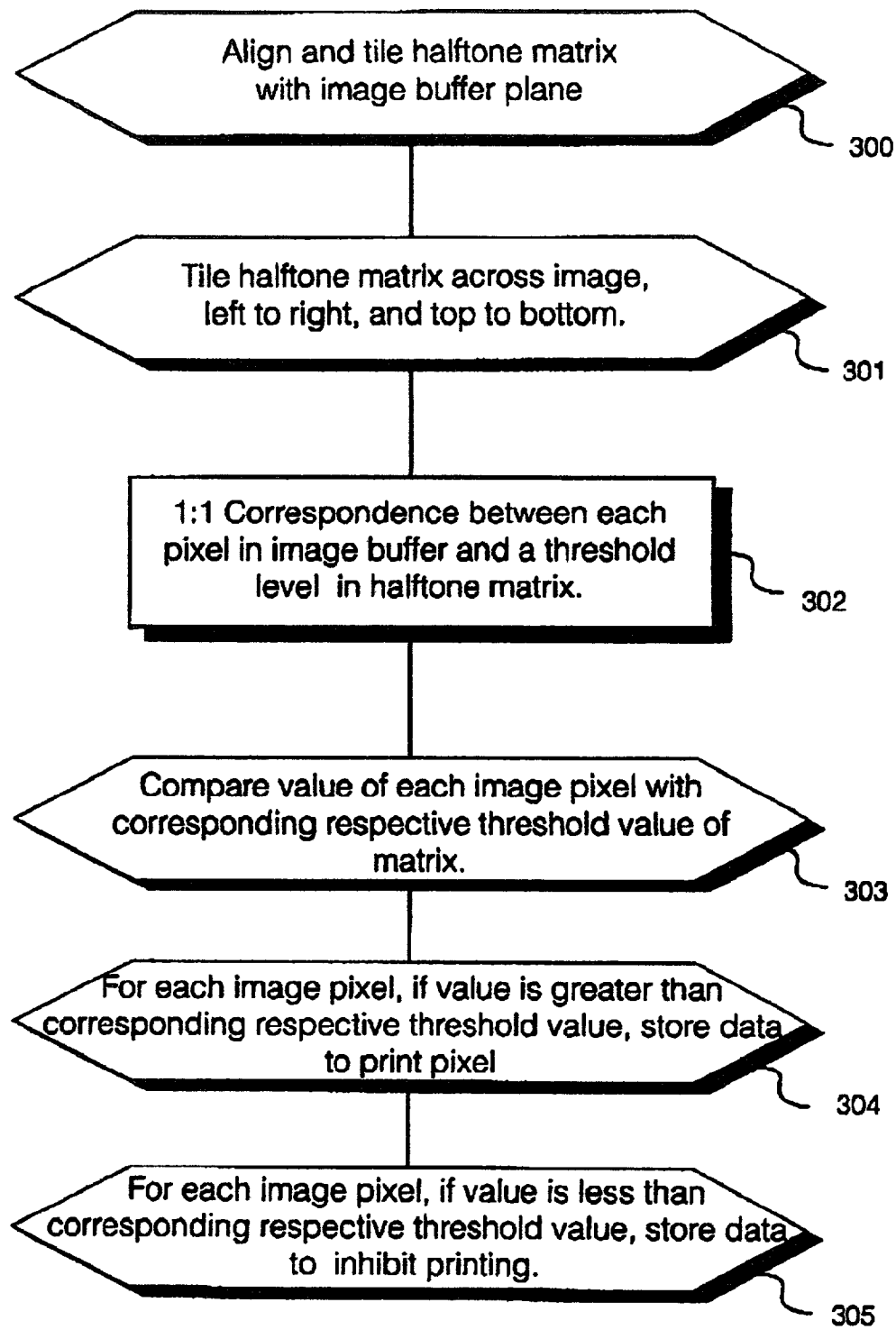
FIG. 3 illustrates schematically prior art signal processing steps for producing a color halftone image matrix from a plurality of image color planes, and a plurality of halftone threshold matrices.
Figure 4:
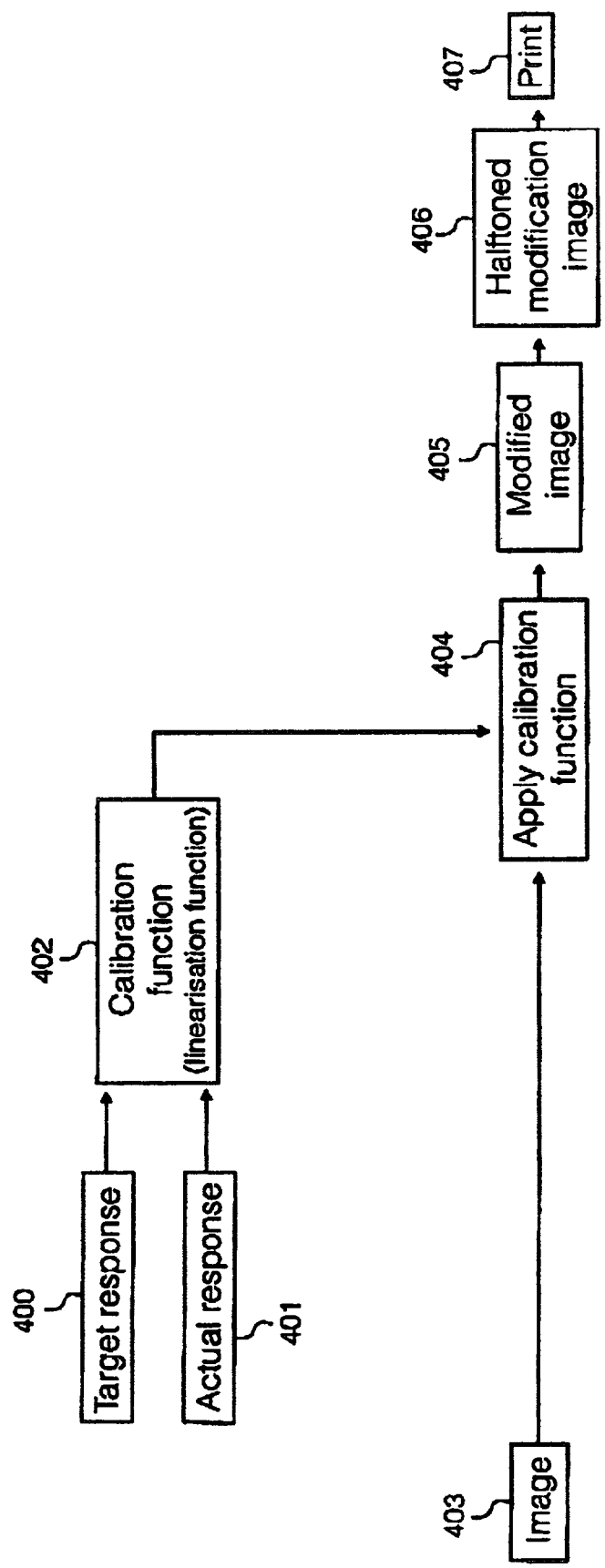
FIG. 4 illustrates schematically a prior art method of applying a correction function to an image data in a known printer device, prior to applying a halftoning process.

The tone correction function calculates a correction of a particular state of the printer system. The state of the device includes things such as a particular paper which is being printed on, a particular print head used, or the like. Linearizations of the image data are calculated dynamically. The tone correction function applied to the high bit content matrix data in the level vector re-groups the high resolution threshold values into 256 levels to achieve a tone correction and results in the tone corrected 8 bit per pixel halftone threshold matrix 802, which is stored in a read only memory or disk in a printer device, and which is used for applying a halftone to an image color plane 100 as described with reference to FIGS. 1 to 3 herein.

Linearization functions may be calculated based on a test target which is printed to a print media and then measured by an optical sensor provided in a printer device. Based on the readings from the sensor, which depends on the printing on the print media, the printer calculates a correction function, and the function can either be stored as a function, or in the best mode, as a vector. Once the vector is obtained, this is applied to the high bit content halftone matrix, to obtain a lower bit content tone corrected halftone matrix. The linearization function is not known beforehand, but depends on the state of the printer, and is calculated dynamically in the printer. The printer is capable of calculating its own linearization functions, and storing these as vectors, depending on the state of the printer, and which consumables it is using.

The linearization vector is a representation of a tone response which is desired to be built in to a resulting low resolution 8 bit per element threshold level matrix in the printer device. The tone correction function applied to the threshold data in the level vector has the effect of modifying the percentage of dots which are printed in the final print image for each gray level (pixel value), compared with a conventional 'dot linear' halftone matrix which adds the same number of dots for each successive gray level. For example if in a conventional halftone matrix for an image having a gray level of 127 (assuming 256 different levels of gray), on average half of those pixels will be printed and half will not be printed in the final print image. By applying a tone correction function, the percentage of dots printed can be varied. For example for an image having gray content at a level of 127, (half way up the gray scale), after passing through the corrected halftone threshold level matrix, only 40% of those pixels will be present in the final print image matrix. 60% of those pixels will be inhibited from printing due to the halftone matrix.

Due to dot gain and a number of other physical factors, in general it is preferable to print fewer than 50% of the dots for an image having a 50% gray level (ie a level of 127) so for example for a 50% gray level an optimum percentage of dots printed may be for example 40% in a tone corrected print image.

Figure 9:
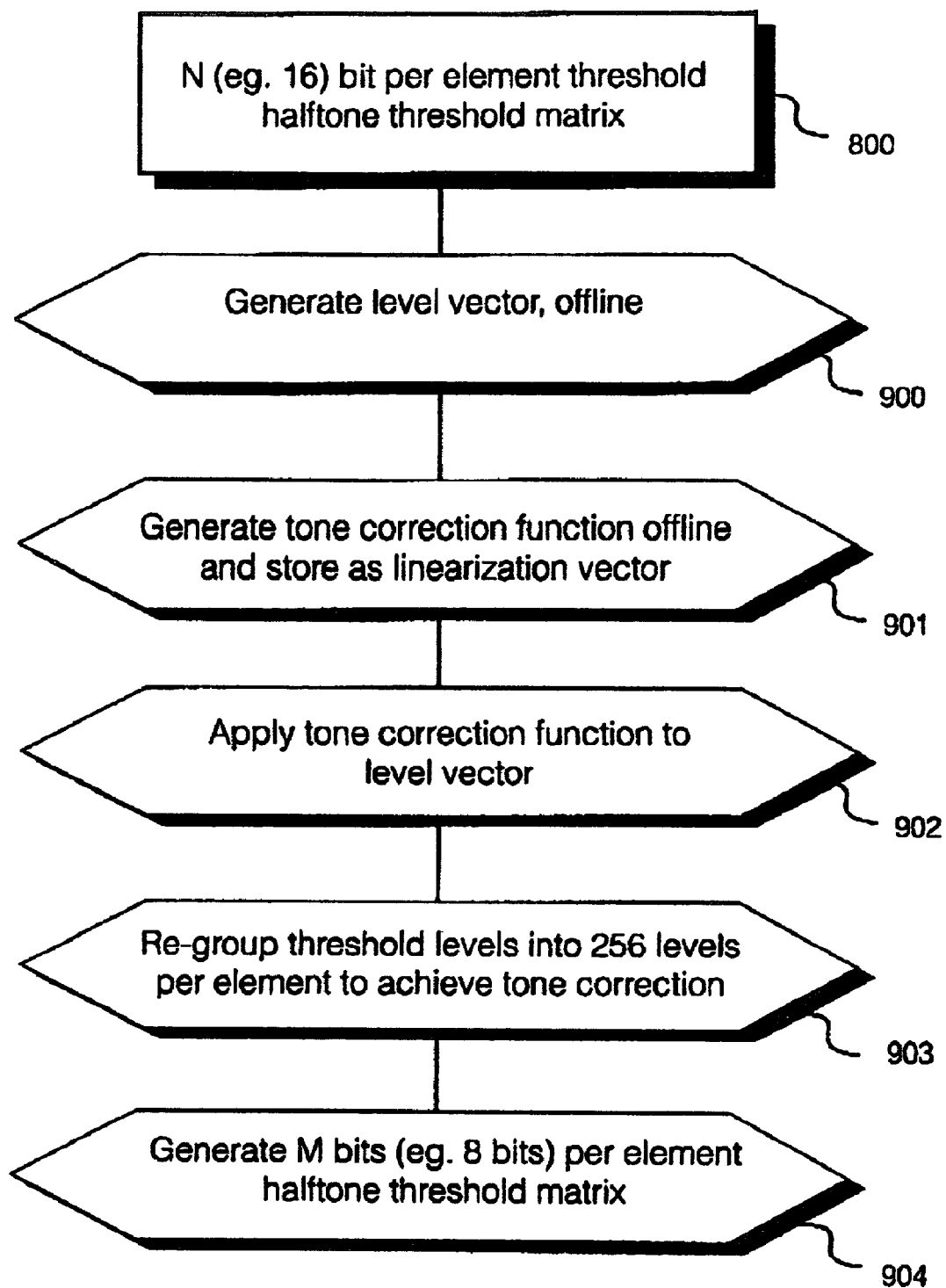
FIG. 9 illustrates schematically process steps carried out by a processor device on a high bit content halftone matrix data for producing a lower bit content halftone data matrix.

Referring to FIG. 9 herein, there are illustrated schematically signal processing steps for producing the 8 bit per element tone corrected halftone threshold matrix 802. Starting initially with a 16 bit per element 256×256 element halftone threshold matrix 800, in step 900, a level vector comprising a plurality of 16 bit X, Y indexed coordinate entries is produced. The level vector is produced offline outside of a printer system from an initial 16 bit per element halftone threshold level matrix, but the level vector itself is stored in the printer system. In step 901, there is generated a tone correction function online as described in FIG. 5, which is stored as a linearization vector 801 in the printer. In step 902, the predetermined tone correction function represented in the linearization function is applied to the level vector. In step 903, application of the linearization vector to the level vector results in regrouping of threshold levels into 256 levels, to achieve a tone corrected 8 bit per element halftone threshold matrix 802.

Figure 10:
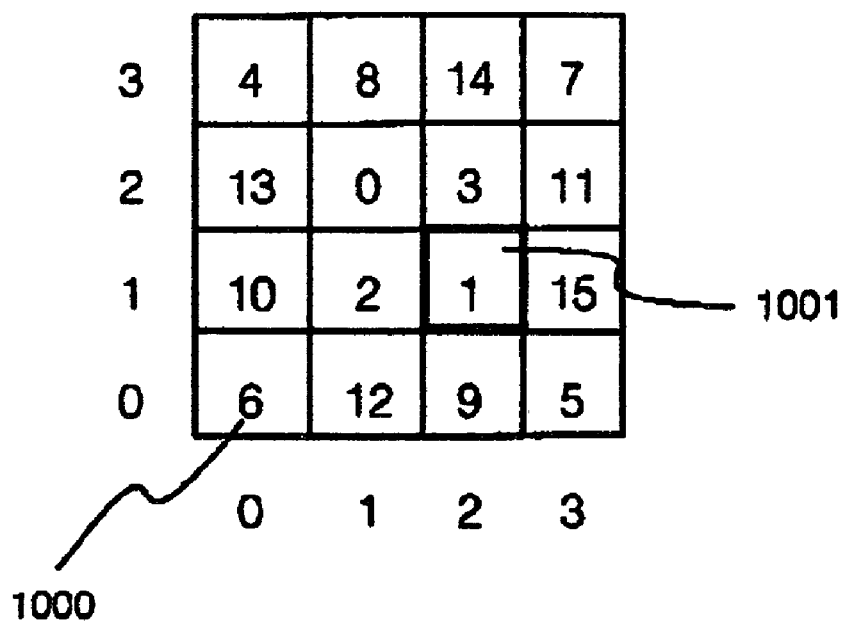
FIG. 10 illustrates schematically a two dimensional representation of a prior art halftone matrix data.

Referring to FIGS. 10 and 11 herein, there will now be described generation of a level vector, containing threshold level data, from a 256×256 16 bit per element threshold level matrix.

In FIG. 10 herein, there is shown schematically a threshold matrix 1000. For simplicity in FIG. 10, a 4×4 element matrix is shown. The numbers inside the cells in FIG. 10 represent threshold values, and the numbers outside the cells indicate the coordinates of each pixel within an image plane. The matrix shown in FIG. 10 would be applied to a single color plane of an image.

According to the best mode disclosed herein, as illustrated schematically in FIG. 11, 16 bit threshold data is stored in read only memory or on disk in a printer, in a linear vector format 1100. The format illustrated in FIG. 11 herein is representative of a segment of a much larger array, and for illustrative purposes only is shown herein containing the same data as that shown in FIG. 10 herein. In FIG. 11, the data is stored in a format termed herein a "level vector". Threshold value levels are represented as index values, there being shown the first 16 different levels of threshold value in this example. In the best mode implementation there are 65,536 possible different index values, each representing one of $2^{16}$ threshold levels for a 16 bit threshold data. There are also 256×256=65,536 possible different X, Y values, corresponding to the number of elements in a 256×256 element array. For each threshold value level index, the (X and Y) coordinates in a plane is represented by an 8 bit horizontal axis coordinate data (X) and an 8 bit vertical axis coordinate data (Y). In FIG. 11, the bold area 1001 corresponds to the same data entry as the bold outlined area in FIG. 10 herein. The level vector can be generated offline, that is to say outside the printer, from a 256×256 element 16 bit per element threshold level matrix.

Starting with a two dimensional 256×256 element halftone threshold matrix where each element has a 16 bit threshold value, of 65,536 possible values the two dimensional matrix is converted to a level vector format as illustrated schematically in FIG. 11 herein. The original two dimensional halftone matrix has $2^{16}$ elements, and can therefore represent $2^{16}+1$ unique numbers of dots. Each number of dots is represented by a dot level. Each of the halftone threshold values of the original 16 bit level matrix is converted into a corresponding vector entry having an X position and a Y position at an index value. 65,536 index values, corresponding to 65,536 different halftone threshold levels are available.

In the case of a 256×256×16 bit linearization matrix, prior to conversion this has $2^{16}$ 16 bit entries and therefore occupies $2^{17}$ bytes memory. The same data reconfigured into level vector format as shown schematically in FIG. 11, requires $2^{16}$ entries each composed of two 8 bit values, occupying $2^{17}$ bytes of memory, that is to say the same amount of memory as the original linearization matrix.

Figures 12, 13:
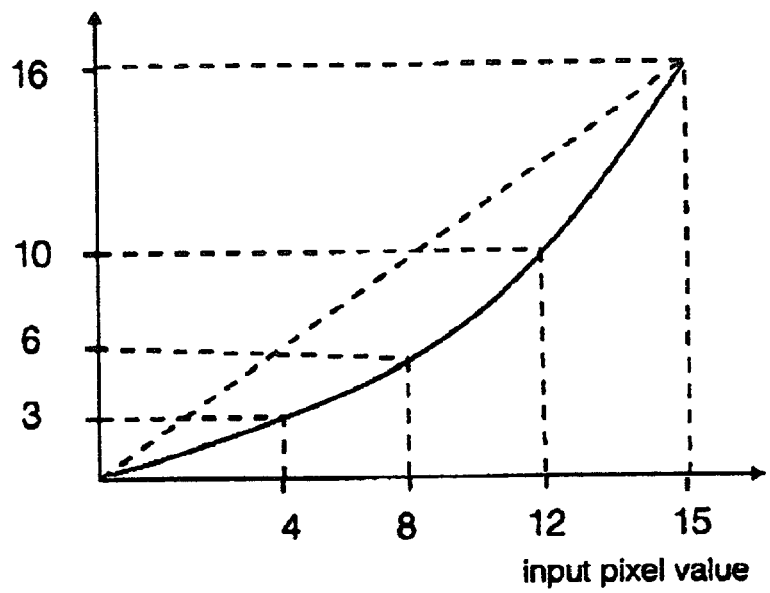
FIG. 12 illustrates schematically in graphical format an example of a linearization function plotting input pixel value against the number of pixels to be printed.
FIG. 13 illustrates schematically a linearization vector implementing the linearization function of FIG. 12.

Referring to FIG. 12 herein, there is shown schematically an example of a linearization function in two-dimensional graphical format. For any input pixel values on the horizontal axis, there is a corresponding number of output pixels printed, given on the vertical axis. For example, for an input pixel value of 12, 10 pixels are printed.

Referring to FIG. 13 herein, there is illustrated schematically a linearization vector corresponding to the linearization function illustrated schematically in FIG. 12 herein. In FIG. 13, for each input pixel value 0–65, 535, there is a corresponding respective number of output pixels to be printed as illustrated. The linearization vector is calculated dynamically. This is then applied to image data to be printed.

Figure 14:
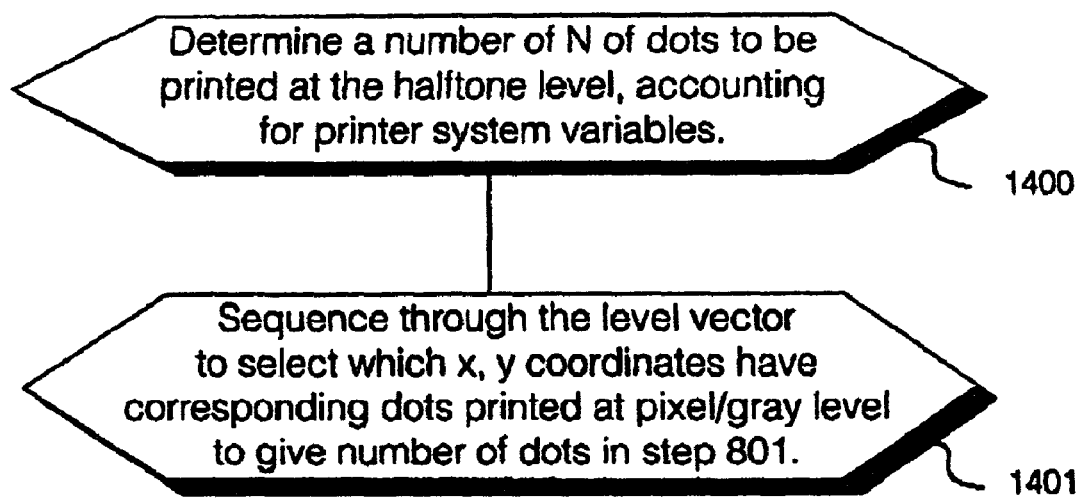
FIG. 14 illustrates schematically process steps for converting a two dimensional halftone threshold level matrix into a level vector format, applying a correction function to that level vector, and converting the tone corrected level vector to a two dimensional low bit content halftone matrix data.

Referring to FIG. 14 herein, there are illustrated schematically data processing steps carried out to apply a tone correction function stored in a linearization vector to threshold level data stored in a level vector format, to result in a tone corrected 8 bit per element halftone threshold matrix 802 as illustrated in FIG. 8 herein.

A general form of the linearization vector would be a vector of 256 16-bit elements. Each element defines the number of dots to be "turned on" at the halftone level corresponding to the index. For example if the entry at index 13 was 873, then 873 in the 8 bit threshold matrix would be at or below the threshold value of 13.

In step 1400, depending upon the physical printer parameters, and other variables effecting the correction, a number of dots per image plane which are to be printed are selected. Normally to print 50% gray, this would be half the number of pixels, i.e. 32,768 dots. However, in a halftone matrix, where, for example 40% of the dots are to be printed, then 40%×256×256 equals 26214 dots would be printed, so the corrected halftone matrix 801 would print 26214 dots.

To generate the 256×256×8-bit resolution linearization corrected halftone matrix, an algorithm sequences through the level vector in step 1401 assigning threshold values to each of the X, Y coordinate entries in the level vector. If the first element of the linearization vector contains for example the number 12, then the first 12 locations specified by the level vector are assigned threshold value 1. For the second element in the linearization vector, assuming this is a value of 47, the next 35 (i.e. 47–12) locations specified by the level vector are assigned a threshold value 2. This is repeated until all the values in the linearization vector have been processed, thereby assigning a threshold value to all the cells in the 256×256×8-bit low bit content matrix.

Figure 15:
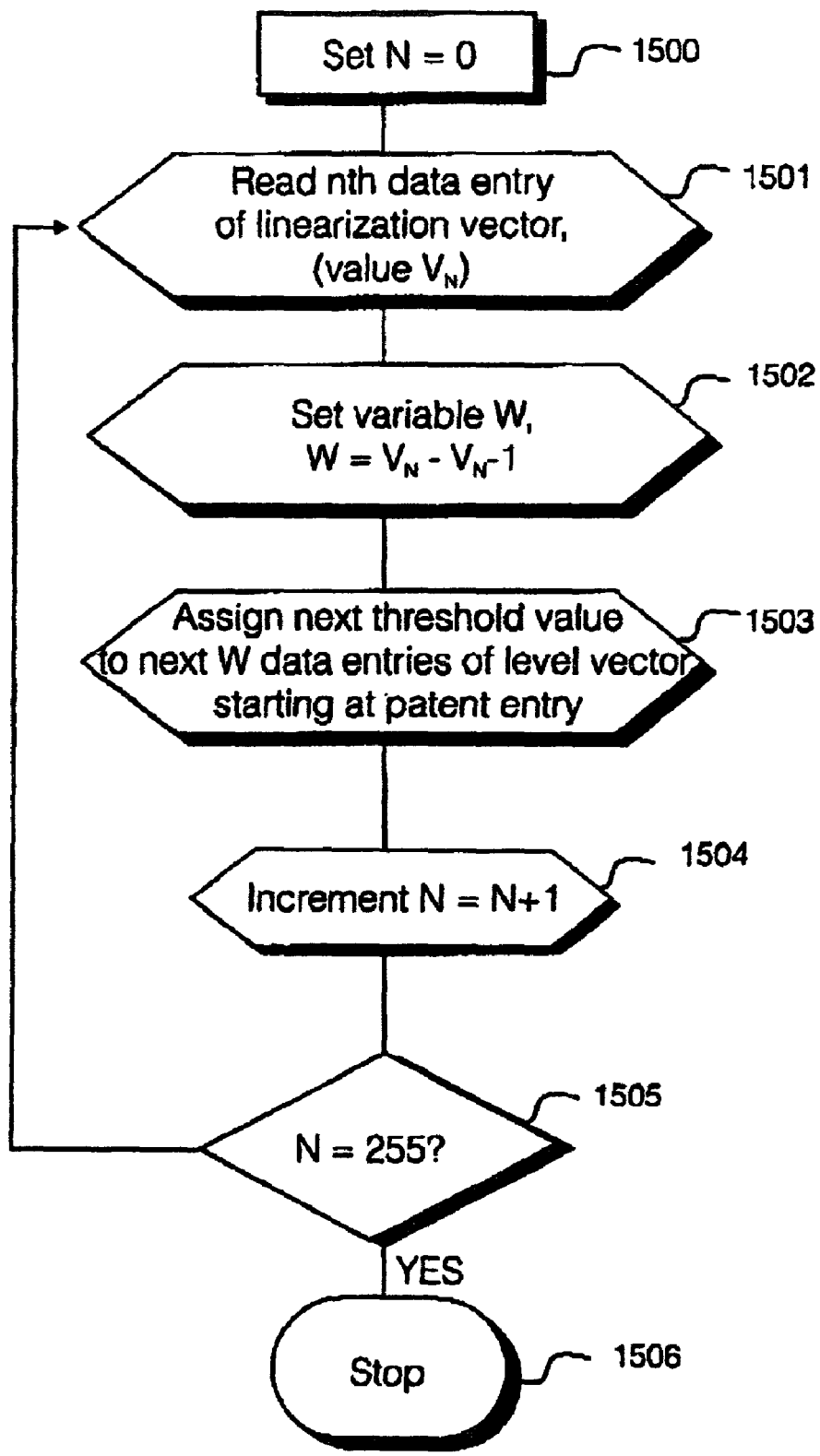
FIG. 15 illustrates schematically an algorithm for assigning threshold values to data entries in a level vector dynamically to produce a lower bit content 8 bit per element two dimensional halftone threshold matrix in a printer device.

Referring to FIG. 15, there is illustrated a possible algorithm for sequencing through the level vector in step 1401 to produce the lower bit content 8 bit halftone threshold level matrix 704 dynamically. In step 1500, a variable N is set to 0, where N is the position of a number in the list of numbers comprising the linearization vector. In step 1501, the data entry of the linearization vector is read, giving a value $V^n$. In step 1502, a variable W is set as $W=V_n-V_n-1$. In step 1503, a threshold value, starting at 0 for a 256 level scale rising to 255, is assigned to the next W data entries of the level vector. For example, if the value in the first entry N=0 is 12, then the initial threshold value 0 is assigned to the first 12 data entries of the level vector. In step 1504, the number of linearization vector entry is incremented to N=N+1. If N is less than 255 in step 1505, then the sequencing through the linearization vector repeats in steps 1501–1505. For the second sequence, looking at the second value N=1 in the linearization vector, if the value is 47, then in step 1502 the variable W is set to 47−12=35, and the next 35 locations, ie locations 12–46 are assigned the next threshold level value ie threshold value 1.

Similarly, the algorithm sequences down the linearization vector assigning subsequently higher threshold values in the range 0–255 to the remaining data entries in the level vector. When the last data entry in the linearization vector ie N=255 is reached in step 1505, the algorithm stops, as each X, Y coordinate data entry in the level vector has been assigned a corresponding threshold level value. Since the algorithm assigns a threshold level to a range of data entries in the level vector, the higher bit content halftone values represented by the index number of the level vector are quantized to their nearest equivalent low bit content threshold level ie in the range 0–255.

The invention claimed is:

1. A method of generating halftone threshold matrix data for an image printer, said method comprising the steps of:
    taking a stored high bit content halftone matrix data;
    reducing said high bit content halftone matrix data to a relatively lower bit content halftone matrix data, within said image printer, wherein said step of reduction comprises incorporating a dynamically generated printer response correction function into said relatively low bit content halftone matrix data by applying said printer response correction function to said high bit content halftone matrix data in vector format.

2. A method of generating halftone matrix data having a predetermined response of number of dots printed as a function of digital input value, said method comprising the steps of:
    storing data describing a plurality of data elements as a plurality of vector entries, each said vector entry comprising an index number corresponding to a higher bit content per element halftone threshold level, an X coordinate data corresponding to a position in a first dimension, and a Y coordinate data corresponding to a position of said entry in a second dimension, said X and Y coordinate data positioning said index number in a two dimensional plane;
    storing a tone correction data as a list of numbers;
    sequencing through said list of numbers and for each said number of said list, assigning a halftone threshold level to a corresponding number of said vector entries, wherein for each said number of said list, a different said halftone threshold value is assigned; and
    generating a lower bit content per element two dimensional halftone threshold level matrix from said plurality of vector entries and their corresponding respective assigned halftone threshold levels.

3. The method according to claim 2, wherein said step of generating a two dimensional halftone threshold level matrix further comprises:
    for each said vector data entry, storing a threshold level data assigned to said index value in a position within said two dimensional halftone threshold level matrix corresponding to said X and Y coordinates of said vector data entry.

4. A method of generating halftone threshold data for an image printing system, said method comprising the steps of:
    storing a higher bit content threshold level data, comprising a plurality of individual threshold level elements;
    converting said higher bit content threshold level data into at least one level vector, said level vector comprising a plurality of vector data entries each of an index value number representing a high bit content level value of a halftone threshold level value, and a corresponding coordinate of said threshold level value;
    applying a tone correction function by specifying a number of said vector data entries to be selected;
    selecting said number of vector data entries from said plurality of vector data entries in said level vector, said selected plurality of vector data entries having highest index numbers, corresponding to highest threshold level numbers of said plurality of vector data entries; and
    transforming said plurality of selected vector data entries into a lower bit content two dimensional threshold data.

5. The method according to claim 4, wherein said high bit content threshold level data comprises a matrix having 16 bits per element.

6. The method according to claim 4, wherein said low bit content threshold data comprises a plurality of elements each having 8 bits per element.

7. The method according to claim 4, wherein said high bit content threshold level data further comprises a plurality of two-dimensional planes, wherein a plane of said plurality of two-dimensional planes is provided per each color of an image to be printed.

8. A method of applying a correction to image data to correct for a printer response characteristic; said method comprising the steps of:
   generating a correction characteristic to correct for said printer response characteristic, wherein said printer response characteristic is based on a response characteristic of a printer device;
   applying said correction characteristic to a relatively high bit content half tone matrix data, to obtain a relatively low bit content half tone matrix data corrected for said printer response characteristic, wherein said correction characteristic is generated dynamically, and applied to said relatively high bit content halftone matrix in vector format; and
   processing said image data using said relatively low bit content halftone matrix data.

9. The method according to claim 8, wherein said step of generating a correction characteristic is carried out automatically by said printer device.

10. A method of applying a correction to image data to correct for a printer response characteristic; said method comprising the steps of:
   generating a correction characteristic to correct for said printer response characteristic, wherein said printer response characteristic is based on a response characteristic of a printer device, wherein said step of generating a correction characteristic is carried out automatically by said printer device;
   applying said correction characteristic to a relatively high bit content half tone matrix data, to obtain a relatively low bit content half tone matrix data corrected for said printer response characteristic, wherein said correction characteristic is generated dynamically, and applied to said relatively high bit content halftone matrix in vector format; and
   processing said image data using said relatively low bit content halftone matrix data.

11. A computer readable storage medium on which is embedded one or more computer programs, said one or more computer programs implementing a method of generating halftone threshold matrix data for an image printer, said one or more computer programs comprising a set of instructions for:
   taking a stored high bit content halftone matrix data; and
   reducing said high bit content halftone matrix data to a relatively lower bit content halftone matrix data, within said image printer, wherein said step of reduction comprises incorporating a dynamically generated printer response correction function into said relatively low bit content halftone matrix data by applying said printer response correction function to said high bit content halftone matrix data in vector format.

12. A computer readable storage medium on which is embedded one or more computer programs, said one or more computer programs implementing a method of generating halftone matrix data having a predetermined response of number of dots printed as a function of digital input value, said one or more computer programs comprising a set of instructions for:
   storing data describing a plurality of data elements as a plurality of vector entries, each said vector entry comprising an index number corresponding to a higher bit content per element halftone threshold level, an X coordinate data corresponding to a position in a first dimension, and a Y coordinate data corresponding to a position of said entry in a second dimension, said X and Y coordinate data positioning said index number in a two dimensional plane;
   storing a tone correction data as a list of numbers;
   sequencing through said list of numbers and for each said number of said list, assigning a halftone threshold level to a corresponding number of said vector entries, wherein for each said number of said list, a different said halftone threshold value is assigned; and
   generating a lower bit content per element two dimensional halftone threshold level matrix from said plurality of vector entries and their corresponding respective assigned halftone threshold levels.

13. The computer readable storage medium according to claim 12, wherein said set of instructions for generating a two dimensional halftone threshold level matrix further comprises:
   for each said vector data entry, storing a threshold level data assigned to said index value in a position within said two dimensional halftone threshold level matrix corresponding to said X and Y coordinates of said vector data entry.

14. A computer readable storage medium on which is embedded one or more computer programs, said one more computer programs implementing a method of generating halftone threshold data for an image printing system, said one or more computer programs comprising a set of instructions for:
   storing a higher bit content threshold level data, comprising a plurality of individual threshold level elements;
   converting said higher bit content threshold level data into at least one level vector, said level vector comprising a plurality of vector data entries each of an index value number representing a high bit content level value of a halftone threshold level value, and a corresponding coordinate of said threshold level value;
   applying a tone correction function by specifying a number of said vector data entries to be selected;
   selecting said number of vector data entries from said plurality of vector data entries in said level vector, said selected plurality of vector data entries having highest index numbers, corresponding to highest threshold level numbers of said plurality of vector data entries; and
   transforming said plurality of selected vector data entries into a lower bit content two dimensional threshold data.

15. The computer readable storage medium according to claim 14, wherein said set of instructions for high bit content threshold level data comprises a matrix having 16 bits per element.

16. The computer readable storage medium according to claim 14, wherein said set of instructions for low bit content threshold data comprises a plurality of elements each having 8 bits per element.

17. The computer readable storage medium according to claim 14, wherein said set of instructions for high bit content threshold level data further comprises a plurality of two-dimensional planes, wherein a plane of said plurality of two-dimensional planes provided per each color of an image to be printed.

18. A computer readable storage medium on which is embedded one or more computer programs, said one or more computer programs implementing a method of applying a correction to image data to correct for a printer response characteristic; said one or more computer programs comprising a set of instructions for:
- generating a correction characteristic to correct for said printer response characteristic, wherein said printer response characteristic is based on a response characteristic of a printer device;
- applying said correction characteristic to a relatively high bit content halftone matrix data, to obtain a relatively low bit content halftone matrix data corrected for said printer response characteristic, wherein said correction characteristic is generated dynamically and applied to said relatively high bit content halftone matrix in vector format; and
- processing said image data using said relatively low bit content halftone matrix data.

19. The computer readable storage medium according to claim 18, wherein said set of instructions for generating a correction characteristic is carried out automatically by said printer device.

20. A computer readable storage medium on which is embedded one or more computer programs, said one or more computer programs implementing a method of applying a correction to image data to correct for a printer response characteristic; said one or more computer programs comprising a set of instructions for:
- generating a correction characteristic to correct for said printer response characteristic, wherein said printer response characteristic is based on a response characteristic of a printer device;
- applying said correction characteristic to a relatively high bit content halftone matrix data, to obtain a relatively low bit content half tone matrix data corrected for said printer response characteristic, wherein said set of instructions for correction characteristic is generated dynamically, and applied to said relatively high bit content half tone matrix in vector format; and
- processing said image data using said relatively low bit content halftone matrix data.

21. An image printer system configured to generate a linearized halftone matrix for a printer, said printer system comprising:
- a dynamically generated linearisation function;
- a high bit half-tone matrix; and
- a processor configured to compile a linearized half-tone matrix based on said linearisation function and said high bit half-tone matrix by applying said linearisation function to said high bit half-tone matrix in vector format.

22. The system according to claim 21, further comprising:
- a target response; and
- an actual response, wherein said processor is further configured to calculate said linearisation function based on said target response and said actual response.

23. The system according claim 21, wherein said printer is configured to print a calibration patch.

24. The system according to claim 23, wherein said processor is further configured to determine said actual response based on said calibration patch.

25. The system according to claim 21, wherein said printer is further configured to print an image based on said linearized half-tone matrix and data associated with an image.

26. An image printer configured to generate a halftone threshold matrix data, said printer comprising:
- a means for taking a stored high bit content halftone matrix data; and
- a means for reducing said high bit content halftone matrix data to a relatively lower bit content halftone matrix data, within said printer, wherein said step of reduction comprises incorporating a dynamically generated printer response correction function into said relatively low bit content halftone matrix data by applying said printer response correction function to said high bit content halftone matrix data in vector format.

* * * * *